Figure 1:
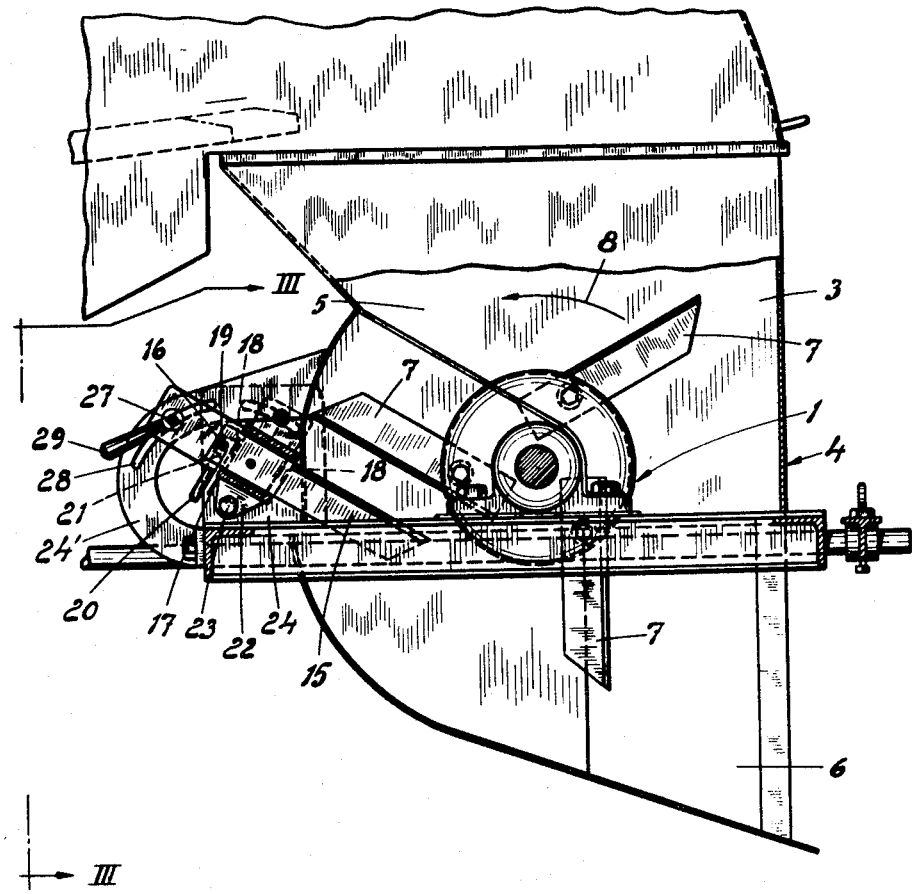

Oct. 4, 1960 — A. B. GRÖNBERG — 2,954,812
STRAW CUTTER FOR COMBINES
Original Filed Aug. 9, 1954 — 3 Sheets-Sheet 1

ANTON BERTIL GRÖNBERG
INVENTOR.

BY Cushman, Darby & Cushman
ATTORNEYS

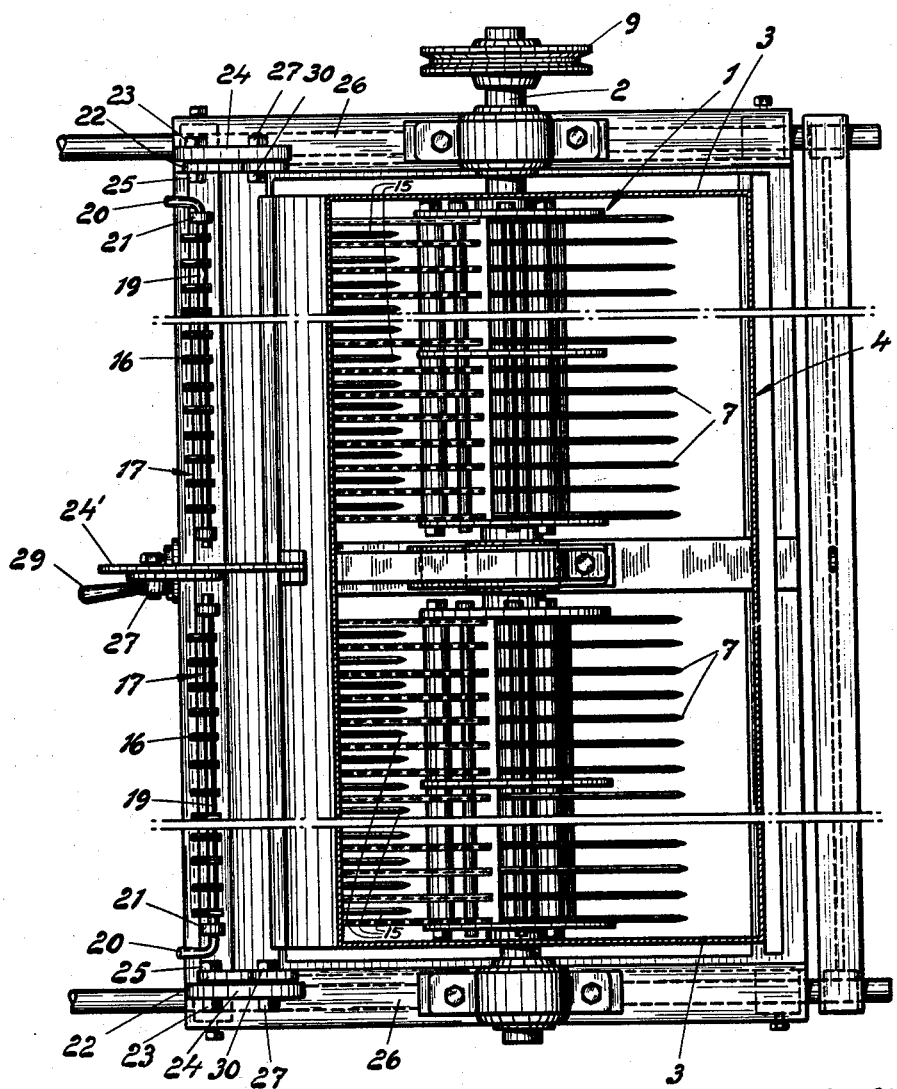

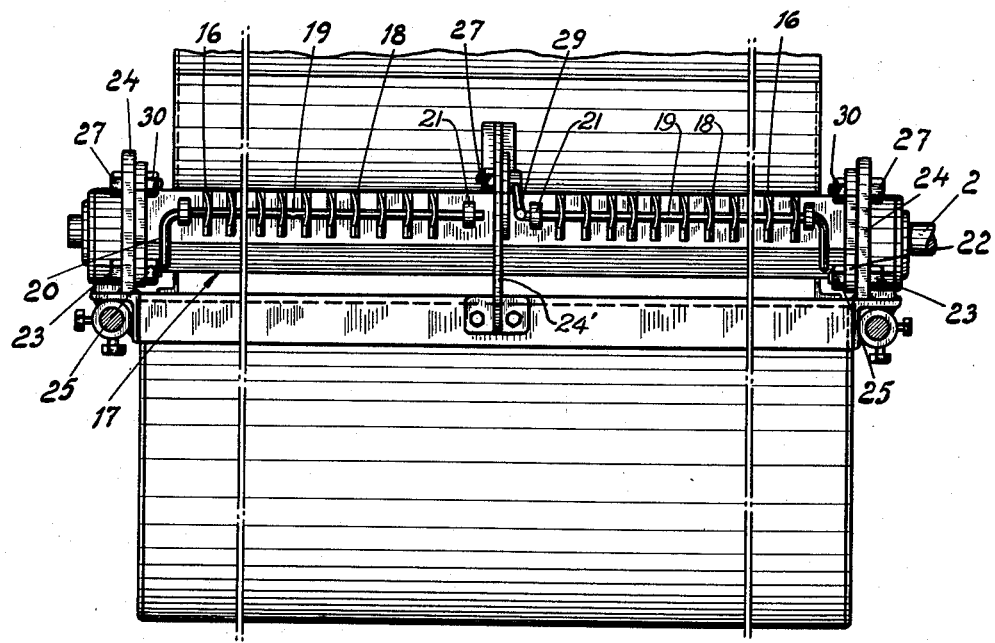

2,954,812

STRAW CUTTER FOR COMBINES

Anton Bertil Grönberg, Ottum, Sweden

Original application Aug. 9, 1954, Ser. No. 448,462, now Patent No. 2,862,536, dated Dec. 2, 1958. Divided and this application Jan. 14, 1958, Ser. No. 708,907

4 Claims. (Cl. 146—123)

This invention relates to a device for simultaneously cutting and crushing straw, green fodder and the like and is a division of the disclosures of application Serial No. 448,462 filed August 9, 1954, now Patent No. 2,862,536.

My invention relates to a device having in combination, a cutter housing for receiving straw, green fodder and like material from above, said housing having an opened top and bottom and closed sides, a transversely disposed shaft rotatably mounted in the housing and having longitudinally spaced cutting blades, spaced grate arms extending into said housing, said blades arranged to pass between said arms when said shaft is rotated.

One object of my invention is to provide means for the attachment of the grate arms, and for this purpose I provide a box-formed holding bar parallel to the cutter shaft of the device. Two opposite sides of the holding bar are provided with apertures for receiving the rear ends of said grate arms which ends are bent to form a curve having its radius perpendicular to the longitudinal direction of the arms. There will thus be obtained a clamping effect between the walls of the apertures and said rear end of the arm in question. For securing the grate arms when inserted in the holding bar, one or several holes are provided in said rear ends, and through these holes is forced a rod attached to the frame of said housing.

Another object of my invention is to make the arms angularly adjustable and I therefore provide means for locking the holding bar in different rotated positions.

In order to increase the effect of the device of the art as mentioned above I also propose an arrangement of the holding bar in level with the cutting blades.

In the following, I will now describe my invention with reference had to the accompanying drawings, wherein:

Fig. 1 shows a vertical cross section through the device according to the invention, Fig. 2 is a partly broken view from above of the same, and Fig. 3 shows the device according to the invention seen in the direction of the arrows III—III in Fig. 1.

The cutting device according to my invention comprises a cutter 1 which is journalled in a housing 4. The shaft 2 of the cutter 1 is carried on a frame at the outside of the end walls 3 of the housing 4 which is preferably manufactured from metal sheet. The housing 4 has further at its upper end an inlet opening 5 for receiving the material to be cut and an outlet opening 6 for the discharge of the cut and crushed material. A plurality of knives 7 are attached to the shaft 2 and arranged perpendicularly to the latter. These knives 7 are preferably provided with edges. The cutter runs in the direction indicated by the arrow 8 in Fig. 1, e.g. driven by a cone belt, acting on a driving pulley 9 which is arranged at one end of the shaft 2.

A plurality of grate arms 15 are carried at their rear end 16 by a box-formed holding bar 17 extending parallel to the shaft 2. In two opposite longitudinal walls, the bar 17 has aligned apertures 18 the width of which somewhat exceeds the thickness of the arms 15. In order to fix the arms 15 to the holding bar 17, the arms 15 are at their rear ends 16, each bent to form a curve the radius of which is perpendicular to the longitudinal direction of the same. When thus the rear ends of the arms 15 are inserted in the apertures 18, the borders of said arms will rest against one side wall of said apertures and the center portion of said end will rest against the opposite side wall, whereby a clamping effect is obtained and the arms will with security be fixed to the holding bar 17 and without any clearance between said portions.

For increasing the security with which the arms 15 are fixed, a rod 19, extending parallel to the shaft 2 and the holding bar 17, is forced through holes in said rear ends 16 of the arms 15. It is of course possible to arrange several such rods 19. In order to make possible a lengthening or shortening of the effective length of the grate arms 15, the end portions of the same may be provided with a plurality of holes for said rod or rods 19 arranged in different distances from the end of the grate arms 15. As obvious especially from Fig. 2, the ends 20 of the rods 19 are bent at angles to form a handle for pushing the rod into one or the other of the holes of the rear portion 16 of the arms 15. Furthermore, the rod or rods 19 are forced through lugs 21 attached to the holding bar 17 in order to fix the longitudinal position of the rods.

In order to make the holding bar 17 angularly adjustable I have provided the same with lugs 22 at its lower side, one at each of its ends and one at its central portion in the shown embodiment. A screw 23 is passed through said lug 24 and a corresponding lug 24 on the frame 26 of the cutting device and secured by means of a nut 25. The screw 23 serves as a shaft at a turning of the holding bar 17. In order to secure the same in the desired position I have provided a screw 27 which slides in a slot 28 in the lug 24 and is lockable in any desired position by means of handle 29 provided at one of its ends with a nut 30.

It is to be understood that by means of my invention, the grate bars could be adjusted to any angular position in relation to the knives 7.

It is also to be understood that the holding bar is to be arranged in level with the shaft 2.

The device according to my invention could be stationary as well as be coupled to the rear end of a combine and below the straw discharge of the same.

When using the cutter for disintegrating green fodder, it is preferable to manufacture the housing 4 in such a way that there is an open space below the grate arms 15 in which space cut material falls down and is thereby prevented from being brought along with the cutter in its rotation.

I claim:

1. In combination, a cutting device having a frame, a cutter housing mounted on said frame for receiving straw, green fodder or like material from above said cutting device, said housing having an opened top, bottom and closed sides, a transversely disposed shaft rotatably mounted in said housing and having cutting blades extending radially and outwardly therefrom, laterally spaced grate arms extending into said housing, said blades arranged to pass between said grate arms when the shaft is rotated, a transversely disposed box-shaped holding bar having spaced confronting sides provided with longitudinally spaced aligned apertures, each of said grate arms having an inner end loosely extending through said apertures so as to project beyond said holding bar, the inner ends of each of said grate arms having at least one hole, a transverse rod attachable to said frame and passing through said holes in the grate arms, means for adjustably connecting said holding bar to said frame, and means for locking the holding bar in different angular positions relative to said knives.

2. The combination as called for in claim 1 in which said holding bar is positioned substantially level with said rotary cutter.

3. The combination as called for in claim 1 in which each of said grate arms has its inner end curved, the radius of said curve being perpendicular to the longitudinal direction of said grate arms.

4. In combination, a cutting device having a frame, a cutter housing mounted on said frame for receiving straw, green fodder or like material from above said cutting device, said housing having an opened top, bottom and closed sides, a transversely disposed shaft rotatably mounted in said housing and having cutting blades extending radially and outwardly therefrom, laterally spaced grate arms extending into said housing, said blades arranged to pass between said grate arms when the shaft is rotated, a transversely disposed box-shaped holding bar having spaced confronting sides provided with longitudinally spaced aligned apertures, each of said grate arms having an inner end loosely extending through said apertures so as to project beyond said holding bar, the inner ends of each of said grate arms having at least one hole, a transverse rod attachable to said frame and passing through said holes in the grate arms, said holding bar having spaced longitudinally disposed lugs, said frame having longitudinal spaced lugs aligning with the lugs on said holding bar, and link means pivotally connecting the lugs on the holding bar to the lugs on said frame so to connect adjustably the holding bar to the frame, and locking means for maintaining the holding bar in different angular positions relative to the said shaft.

References Cited in the file of this patent

UNITED STATES PATENTS

| 825,426 | Smith | July 10, 1906 |
| 2,213,906 | Ebersol | Sept. 3, 1940 |
| 2,708,582 | Adams | May 17, 1955 |

FOREIGN PATENTS

| 823,061 | Germany | Nov. 29, 1951 |